United States Patent [19]

Saito

[11] Patent Number: 4,600,278
[45] Date of Patent: Jul. 15, 1986

[54] LENS CAP

[75] Inventor: Taizo Saito, Tokyo, Japan

[73] Assignee: Ashai Optical Co., Ltd., Tokyo, Japan

[21] Appl. No.: 709,453

[22] Filed: Mar. 8, 1985

[30] Foreign Application Priority Data

Apr. 20, 1984 [JP] Japan ............................. 59-58010[U]

[51] Int. Cl.⁴ ............................................ G02B 23/16
[52] U.S. Cl. ...................................... 350/587; 220/326
[58] Field of Search ................. 350/587, 579, 580; 220/326, 323, 245

[56] References Cited

U.S. PATENT DOCUMENTS 4,341,436   7/1982   Kanno et al. ..................... 350/587

Primary Examiner—Jon W. Henry
Attorney, Agent, or Firm—Amster, Rothstein & Ebenstein

[57] ABSTRACT

A cap adapted to be detachably mounted to a camera lens, for example, comprises a locking member movable radially of the body of the cap, grooves formed in the body, and a spacer mounted to the locking member. The locking member has engaging legs, which are fitted in the grooves and can be resiliently deformed within spaces. After the locking member has been mounted to the body, the spacer occupies the spaces and prevents the deformation of the legs.

3 Claims, 5 Drawing Figures

LENS CAP

FIELD OF THE INVENTION

The present invention relates to a lens cap that can be detachably mounted to a camera lens or the like.

BACKGROUND OF THE INVENTION

Referring to FIGS. 1-4, there is shown a conventional lens cap which comprises a disklike body 10 and a locking member 20 that is held to the body 10 so as to be radially movable. A pair of support blocks 11 is mounted on the body 10 in a parallel relation to a radius. Each of the support blocks 11 is provided with a retaining groove 12 and a guide surface 13 located over the groove 12. The surface 13 acts to guide sliding movement of engaging legs 21 (described later). A cutout 14 (FIG. 3) is formed in the peripheral portion of the body 10 of the cap between the grooves 12. The ends of the blocks 11 which are on the side of the center of the cap constitute retaining walls 15 that prevent the locking member from coming off radially. The body 10 of the cap further has protrusions 16 to which springs are held.

The locking member 20 has engaging legs 21 and limit surfaces 22 which are in contact with the guide surfaces 13. The legs 21 are fitted in the grooves 12 in the blocks 11 so as to be slidable along the grooves. The locking member 20 is further formed with recesses 23 in which compression springs 24 are received. Each one end of the springs 24 abuts on the protrusions 16 to bias the locking member 20 in such a direction as to protrude from the body 10 of the cap.

The engaging legs 21 have anchoring portions 25 at their front ends, the anchoring portions being brought into engagement with the walls 15. The legs 21 are resilient enough to be capable of deforming to positions at which the anchoring portions 25 no longer engage with the walls 15, as shown in FIG. 4, when the locking member 20 is mounted to the body 10 of the cap. Spaces 26 are formed to allow this deformation.

Thus, in the prior art lens cap, the locking member 20 is always urged to protrude by the action of the compression springs 24. The protruding end of the member 20 is confined to the position at which the anchoring portions 25 bear on the retaining walls 15. In order to mount the cap to a lens, the locking member 20 is pushed inwardly with a finger until it covers the lens. Then, the locking member 20 is released. A locking portion 27 formed at the front end of the locking member 20 is engaged into a screw thread formed at the lens barrel to prevent the locking member 20 from coming off.

The engaging legs 21 of the prior art lens cap can preferably be deformed readily with a small force, as shown in FIG. 4 when the body 10 of the cap and the locking member 20 should be assembled easily. However, when the force to retain the lens should be increased, it is desired that the force exerted by the compression springs 24 be increased. Unfortunately, these two requirements have been difficult to satisfy at the same time using the prior art structure. More specifically, when the engaging legs 21 are made easily deformable to facilitate the assembly operation and the force exerted by the compression springs 24 is increased to augment the retaining force, the locking member 20 readily comes off the body 10 of the cap. Especially, when the locking member 20 is pressed inward fully against the action of the springs 24 and then the member 20 is released suddenly, or when an impulsive force is applied to the locking member 20 from outside, the engaging legs 21 are deformed, as shown in FIG. 4, and will disengage the body. When the force exerted by the springs 24 is made strong, the locking member may be prevented from coming off the body by making the legs 21 not easily deformable. However, this will render the assembly operation difficult, and creates the possibility of plastic deformation of the legs 21 or damage to them during assembly operation.

SUMMARY OF THE INVENTION

It is the main object of the present invention to provide a lens cap which is free of the foregoing problems with the prior art lens cap, can be assembled readily, and can produce a stronger force to retain a lens.

The lens cap according to the present invention has been devised based upon the recognition that the spaces in which the engaging legs of the locking member of the prior art lens cap are resiliently deformed are needed only when the locking member is mounted to the body of the cap and that they are not required later. The lens cap according to the invention is characterized in that a spacer is provided on the locking member to prevent deformation of engaging legs in such a way that the spaces which usually allow resilient deformation of the legs are occupied by the spacer after the locking member has been mounted to the body of the cap.

DETAILED DESCRIPTION OF THE INVENTION

Figure 5:
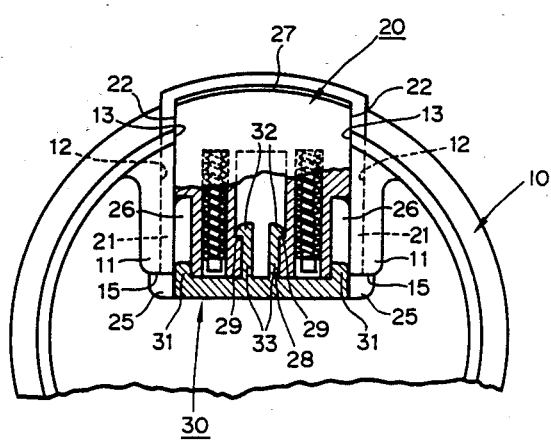
FIG. 5 is a plan view similar to FIG. 1, but showing a lens cap according to the present invention.

Referring to FIG. 5, there is shown a lens cap embodying the concept of the present invention. It is to be noted that in this figure, the same components as those in the previous figures are indicated by the same reference numerals as in the previous figures. The novel lens cap is similar to the conventional cap described above except that a spacer 30 is provided and that the locking member 20 is provided with a groove 28 for receiving the spacer 30.

The spacer 30 is provided on its both sides with protrusions 31 which are inserted into the spaces 26 in which the locking member 20 can resiliently deform. Formed in the center of the spacer 30 are fixed legs 33 having engaging protrusions 32 on their front ends. The groove 28 has steps 29 that come into engagement with the protrusions 32.

Figure 1:
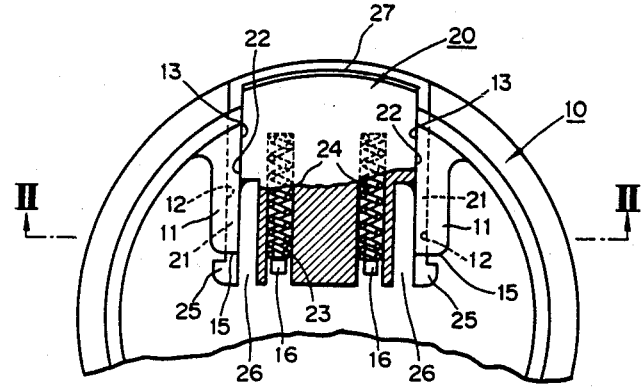
FIGS. 1, 3, and 4 are plan views of a conventional lens cap, for showing different conditions of the cap.
Figure 2:
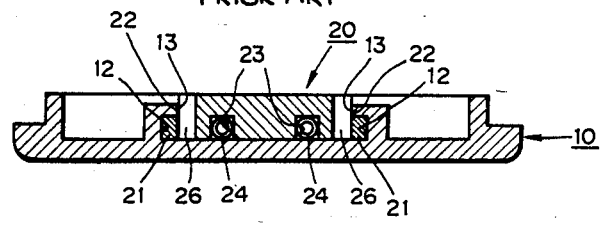
FIG. 2 is a cross-sectional view taken along the line II—II of FIG. 1.
Figure 3:
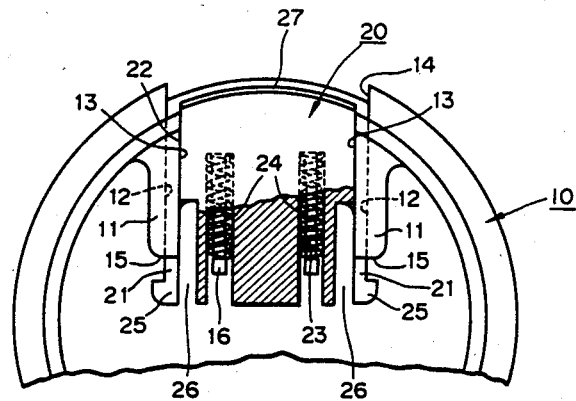
Figure 4:
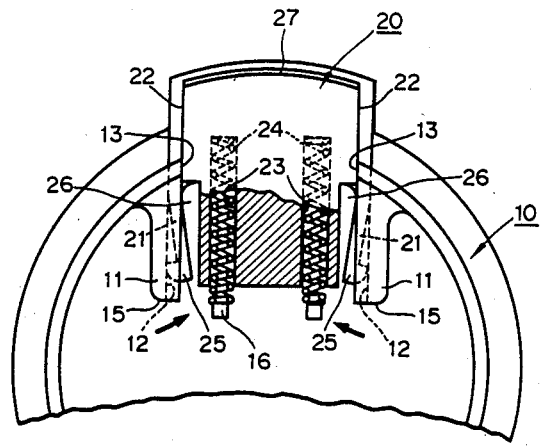

The spacer 30 is mounted to the locking member 20, as shown in FIG. 5, after the engaging legs 21 of the member 20 are deformed, as shown in FIG. 4, and mounted to the body 10 of the cap. In particular, the fixed legs 33 are inserted into the grooves 28, and then the protrusions 32 of the legs 33 are brought into engagement with the steps 29. Subsequently, the protrusions 31 are introduced into the spaces 26 to prevent the legs 21 from deforming.

As thus far described, according to the present invention, the spacer serves to prevent deformation of the engaging legs of the locking member after assembly operation. Therefore, the legs themselves are allowed to deform easily, thus facilitating the assembly operation. Also, the force exerted by the compression springs to urge the locking member outwardly can be set to a large value, whereby the force to retain the lens can be increased.

What is claimed is:

1. In a lens cap having a locking member which is held to the body of the lens cap so as to be movable radially of the body of the cap and is biased in such a direction that it protrudes, retaining portions formed in the body of the cap to prevent the locking member from coming off radially, and engaging legs formed on the locking member and having anchoring portions which are capable of engaging with the retaining portions, the legs being capable of deforming to positions at which the anchoring portions no longer engage with the retaining portions, the improvement wherein a spacer is mounted to the locking member so that it occupies the spaces where the engaging legs can resiliently deform to prevent the deformation of the legs after the locking member has been mounted to the body of the cap.

2. In a lens cap as set forth in claim 1, the further improvement wherein the locking member has a groove to receive the spacer.

3. In a lens cap as set forth in claim 1, the further improvement wherein the spacer has protrusions on its both sides, the protrusions being inserted into the spaces to prevent the deformation of the engaging legs after the locking member has been mounted to the body of the cap.

* * * * *